April 2, 1929.  W. F. PATTEN  1,707,565
BASKET
Filed Aug. 10, 1926
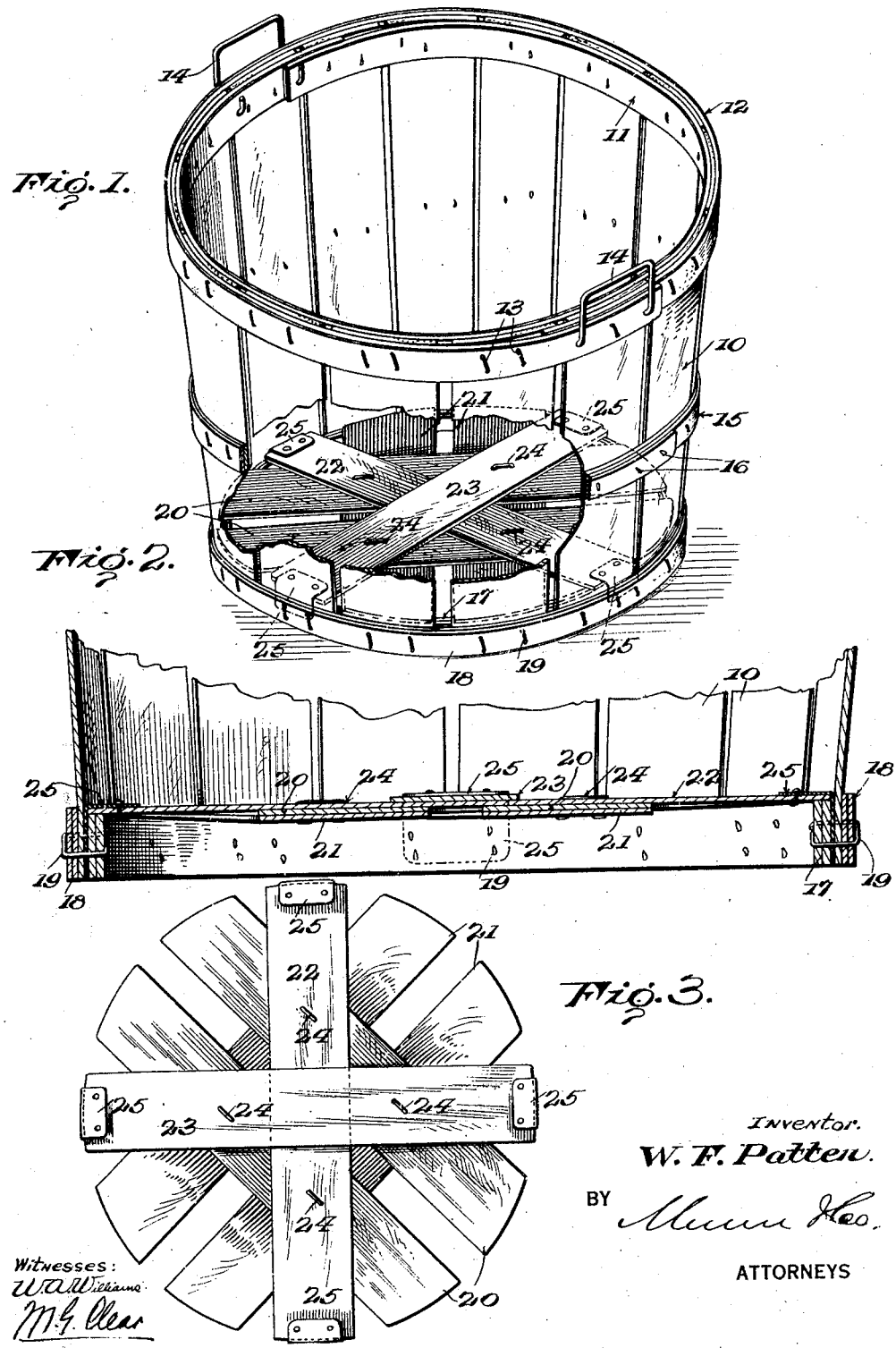

Patented Apr. 2, 1929.

1,707,565

UNITED STATES PATENT OFFICE.

WELLINGTON F. PATTEN, OF CALYPSO, NORTH CAROLINA.

BASKET.

Application filed August 10, 1926. Serial No. 128,389.

My present invention relates generally to baskets and more particularly to fruit packing baskets, my object being directed more particularly to the bottoms of splint baskets of that type in which the surrounding wall and bottom are formed separately, both of splints, in order to provide for a maximum and efficient circulation of air for the better preservation of the fruit packed therein.

Baskets of the above type have been found in use far superior to the type of basket where the splints are crossed at the bottom and carried across the bottom and continued up the sides, from the standpoint of preservation of the fruit, and stacking in cars, wagons or other vehicle of transportation. Up to the present time, however, one disadvantage of that type of baskets, where the bottom was made separate from the body or wall of the basket, has been that the bottoms have a tendency to sag and pull away from or fall through the base of the basket body.

It is the principle object of my invention to provide a splint basket having a splint bottom, the splints of which are so arranged and connected that they mutually co-operate in such bracing relation as to defeat the above and preserve the basket as a whole when fruit is packed therein and the basket tightly closed, and a still further object is the provision of means forming such a connection between the splint bottom and the body of the basket as to prevent the bottom from displacement.

In the accompanying drawings which illustrate my present invention and forms a part of this specification, Figure 1 is a perspective view illustrating my improved basket as a whole, the side of the basket being partly broken away to expose a portion of the bottom thereof, Figure 2 is an enlarged vertical cross section through the lower portion of the basket including the splint bottom, and Figure 3 is a top plan view of the splint bottom.

Referring now to these figures, and particularly to Fig. 1, my invention has to do with that type of splint basket in which the body is formed of a series of spaced apart upright splints 10, connected at their separate ends by inner and outer rings or hoops 11 and 12 attached to one another by staples or the like 13, passing through the upper ends of the upright splints 10. Handles 14 at diametrically opposed points may also assist in securing the inner and outer hoops 11 and 12 as shown.

Intermediate the upper and lower ends of the splints they may be braced by an encircling hoop 15 secured to the splints by staples 16, while at their lower ends the splints 10 are connected, as best seen in Fig. 2, to inner and outer hoops or rings 17 and 18 to which they are securely fastened by staples 19.

The inner hoop 17 at the base of the basket forms a support for the peripheral portion of the bottom which, as proposed by my invention, includes pairs of splints 20 and 21, the pairs of splints crossing one another at right angles off center with respect to the axis of the bottom. The splints of each of these pairs are in the parallel spaced apart relation shown, and another pair of splints 22 and 23 cross the first mentioned pair of splints. These splints 22 and 23 cross one another at right angles in the center of the bottom and also cross the first mentioned pairs of splints 20 and 21, where the latter cross one another. Moreover, the splints 22 and 23 are placed above the pairs of splints 20 and 21 and are securely fastened to the latter where they cross the same by means of staples 24, so that the various splints 20, 21, 22 and 23 with their ends disposed upon the inner hook 17 of the basket body, mutually co-operate with and brace one another so as to prevent sagging of the bottom under pressure, and all danger of its pulling away from the basket body due to the strength thereof.

My invention also proposes fasteners of angular form indicated at 25, securely fastened to the ends of the upper splints 22 and 23, the fasteners consisting of angular plates having depending portions which, in practice, are extended downwardly between the lower ends of the upright splints 10 and the inner bottom supporting hoop 17 and positioned to receive therethrough the staples 19 securing the inner and outer bottom hoops 17 and 18 and the lower ends of the upright splints 10 together.

I have found that a basket bottom such as proposed by my invention may be economically manufactured, will be strong and durable and will entirely obviate the known disadvantage of this type of fruit package.

I claim:—

1. A basket having side staves, a hoop having one end of each stave secured to the outer periphery thereof, a plurality of cross slats forming a bottom and adapted to have their ends supported by the said hoop, means for securing the slats to the hoop comprising a cross slat superimposed over the other cross slats, angle members secured to the ends of said superimposed slat to extend parallel with said side staves, and means for securing said angle members to said side staves.

2. A basket having side staves, an outer hoop formed of a plurality of thin strips around the lower end of said staves, an inner hoop composed of overlapping thin strips on the inside of said staves, a bottom resting on said inner hoop, angle members secured to said bottom and extending between the staves and an adjacent strip forming a part of the inner hoop, and a common means for securing the angle members, hoops and staves together.

WELLINGTON F. PATTEN.